US008886649B2

(12) United States Patent
Zhang et al.

(10) Patent No.: US 8,886,649 B2
(45) Date of Patent: Nov. 11, 2014

(54) MULTI-CENTER CANOPY CLUSTERING

(75) Inventors: Xiong Zhang, Bellevue, WA (US);
Danny Lange, Sammamish, WA (US);
Hung-Chih Yang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 13/423,286

(22) Filed: Mar. 19, 2012

(65) Prior Publication Data
US 2013/0246429 A1  Sep. 19, 2013

(51) Int. Cl.
*G06F 7/00* (2006.01)
*G06F 17/30* (2006.01)

(52) U.S. Cl.
CPC ............... *G06F 17/30598* (2013.01)
USPC ......................................................... 707/737

(58) Field of Classification Search
CPC ............................................. G06F 17/30598
USPC ......................................................... 707/737
See application file for complete search history.

(56) References Cited

U.S. PATENT DOCUMENTS

2011/0060738 A1* 3/2011 Gates et al. ................... 707/737

OTHER PUBLICATIONS

Wang et al., A Constrained Clustering Approach to Duplicate Detection Among Relational Data, Z.-H. Zhou, H. Li, and Q. Yang (Eds.): PAKDD 2007, LNAI 4426, pp. 308-319, 2007.*
Kok et al., Extracting Semantic Networks from Text Via Relational Clustering, W. Daelemans et al. (Eds.): ECML PKDD 2008, Part I, LNAI 5211, pp. 624-639, 2008.*
Sarma et al., An Automatic Blocking Mechanism for Large-Scale De-dupliation Task, CIKM'12, Oct. 29-Nov. 2, 2012, Maui, HI, USA, p. 1055-1064.*
A. D. Sarma, A. Jain, and A. Machanavajjhala. CBLOCK: An Automatic Blocking Mechanism for Large-Scale De-duplication Tasks. Technical report, 2011, pp. 1-16.*
Ngazimbi, M., Data Clustering Using Mapreduce, Boise State University, May 2009, pp. 1-72.*
"Mean Shift Clustering", Retrieved at <<https://cwiki.apache.org/MAHOUT/mean-shift-clustering.html>>, Mar. 16, 2010, pp. 5.
Ngazimbi, Makho, "Data Clustering using MapReduce", Retrieved at <<http://cs.boisestate.edu/~amit/research/makho_ngazimbi_project.pdf>>, Mar. 2009, pp. 1-57.
Gupta, Gaurav, "KMeans Algorithm with Canopy Clustering", Retrieved at <<http://rorlig.wordpress.com/2011/05/13/project-report-cs-292-kmeans-algorithm-with-canopy-clustering/>>, Project Report : CS 292, May 13, 2011, pp. 7.

(Continued)

*Primary Examiner* — Cheyne D Ly
(74) *Attorney, Agent, or Firm* — Nicholas Chen; Kate Drakos; Micky Minhas (57) ABSTRACT

A canopy clustering process merges at least one set of multiple single-center canopies together into a merged multi-center canopy. Multi-center canopies, as well as the single-center canopies, can then be used to partition data objects in a dataset. The multi-center canopies allow a canopy assignment condition constraint to be relaxed without risk of leaving any data objects in a dataset outside of all canopies. Approximate distance calculations can be used as similarity metrics to define and merge canopies and to assign data objects to canopies. In one implementation, a distance between a data object and a canopy is represented as the minimum of the distances between the data object and each center of a canopy (whether merged or unmerged), and the distance between two canopies is represented as the minimum of the distances for each pairing of the center(s) in one canopy and the center(s) in the other canopy.

20 Claims, 6 Drawing Sheets

(56) References Cited

OTHER PUBLICATIONS

Irfan, et al., "S-Canopy:A Feature-based Clustering Algorithm for Supplier Categorization", Retrieved at <<http://ieeexplore.ieee.org/stamp/stamp.jsp?arnumber=05138291>>, 4th IEEE Conference on Industrial Electronics and Applications, May 27, 2009, pp. 677-681.

"K-Means Clustering of Netflix Data (Hadoop version 0.17.0)", Retrieved at <<http://net.pku.edu.cn/~course/cs402/20101codelab/Codelab4.pdf>>, Retrieved Date: Nov. 8, 2011, pp. 1-5.

McCallum, et al., "Efficient Clustering of High-Dimensional Data Sets with Application to Reference Matching", Retrieved at <<http://www.kamalnigam.com/papers/canopy-kdd00.pdf>>, in Proceedings of the Sixth ACM SIGKDD International Conference on Knowledge Discovery and Data Mining (KDD-2001), Aug. 20-23, 2000, pp. 169-178.

"Canopy Clustering", Retrieved at <<https://cwiki.apache.org/MAHOUT/canopy-clustering.html>>, Retrieved Date: Mar. 15, 2012, pp. 5.

"A MapReduce Canopy Clustering Implementation for Netflix Prize", Retrieved at <<http://code.google.com/p/canopy-clustering/>>, Retrieved Date: Mar. 14, 2012, p. 1.

* cited by examiner

MULTI-CENTER CANOPY CLUSTERING

BACKGROUND

Data clustering involves the partitioning of datasets into similar data subsets. Typically, an operation in the data clustering process, such as a distance calculation, computes a metric of similarity between the one dataset or element and another. Unsupervised data clustering allows certain kinds of parallelizable problems involving large datasets to be solved using computing clusters without associated complexities of data dependency, mutual exclusion, replication, and reliability. Data clustering techniques can be applied to many problems. For example, clustering patient records can identify health care trends, clustering address lists can identify duplicate entries, and clustering documents can identify hierarchical organizations of information.

However, data clustering can be computationally expensive, and with the continuing dramatic increase in accessible data, the computational requirements are expected to be increasingly challenging. Even with an aggressive application of parallel computing and distributed storage, the sheer volume of data submitted to data clustering processes can be prohibitive.

SUMMARY

Implementations described and claimed herein address the foregoing problems by employing a canopy clustering process that merges at least one set of multiple single-center canopies together into a merged multi-center canopy. Merged multi-center canopies, as well as the non-merged single-center canopies, can then be used to partition data objects in a dataset. The merged multi-center canopies allow a canopy assignment condition constraint to be relaxed without risk of leaving any data objects in a dataset outside of all canopies. For example, where $T_2$ represents a tight mapping threshold used to define single center canopies, based on similarity metrics, $T_3$ represents a tight merger threshold used to defined merged and non-merged canopies based on similarity metrics, and $T_1$ represents a loose assignment threshold used to assign data objects to canopies based on similarity metrics, the canopy assignment condition constraint can be relaxed to $T_1 > T_3 = T_2 > 0$. Approximate distance calculations can be used as similarity metrics to define and merge canopies and to assign data objects to canopies. In one implementation, a distance between a data object and a canopy is represented as the minimum of the distances between the data object and each center of a canopy (whether merged or unmerged), and the distance between two canopies is represented as the minimum of the distances for each pairing of the center(s) in one canopy and the center(s) in the other canopy.

In some implementations, articles of manufacture are provided as computer program products. One implementation of a computer program product provides a tangible computer program storage medium readable by a computer system and encoding a computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Figure 1:
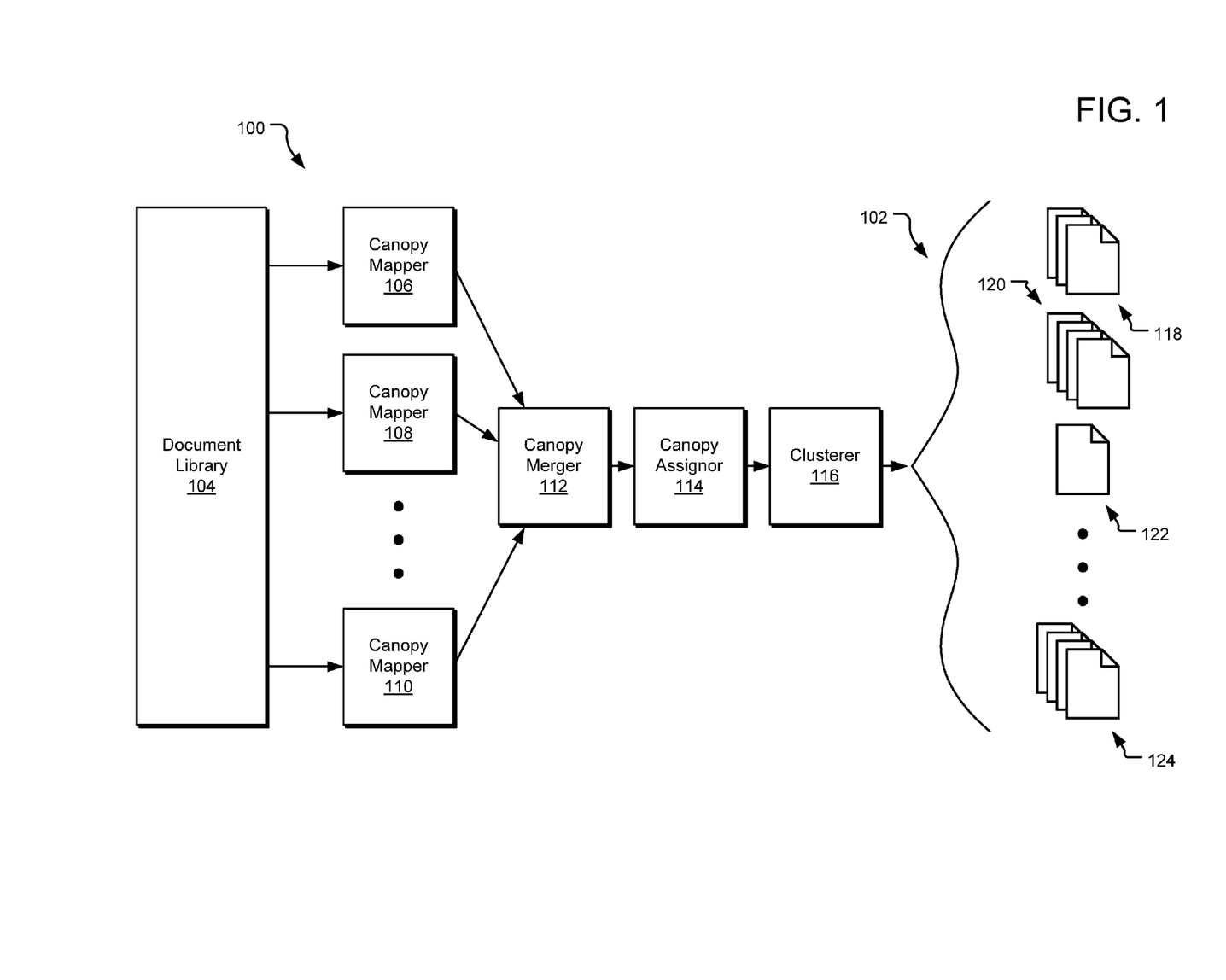
FIG. 1 illustrates an example data partitioning system for using multi-center canopy clustering to partition data objects of a dataset.

FIG. 1 illustrates an example data partitioning system 100 for using multi-center canopy clustering to partition data objects 102 of a dataset (e.g., a document library 104). Data objects may include without limitation data records, text/image documents, audio files, digital data streams and other types of data objects. For example, assume the document library 104 includes medical records containing parameters representing symptoms, medication and other treatments, diagnoses, etc. of a multitude of patients.

The data partitioning system 100 includes multiple, parallel canopy mappers 106 and 108 through 110. Each canopy mapper processes a dataset from the document library 104 to identify candidate canopy centers from the dataset.

Each data object can be represent by a feature vector or some other representation. In one implementation pertaining to text documents, for example, a feature vector may be designated as a vector containing the occurrence frequencies of individual terms and/or phrases within the text document. In another implementation pertaining to images, individual pixel values, recognized feature patterns, recognized edges or shapes may be represented in a feature vector for each image. Other data object representations may alternatively be employed.

In one implementation, each canopy mapper process processes a portion of the input dataset independently (e.g., without communication with other canopy mappers, in parallel with other mappers, etc.). In one implementation, the inputs to a canopy mapper include a tight mapping threshold $T_2$ and a set X of data objects from the portion of the dataset, such that $$X = \{x_1, \ldots, x_n\}$$

where n represents the number of data objects in the portion of the dataset.

A canopy mapper evaluates each data object in its portion of the input dataset, computing approximated similarity metrics among each data object and each other data objects in the portion of the input dataset. A similarity metric and its corresponding thresholds can be applied in terms of pairwise similarity, pairwise distance, or other similarity concepts. Pairwise similarity defines how similar two data objects are, whereas a pairwise distance defines how different two data objects are. Generally, pairwise similarity may be related to a pairwise distance as follows, both of which may be considered types of similarity metrics, depending on the context:

$$\text{distance}(x,y) = 1 - \text{similarity}(x,y)$$

Example similarity metrics may involve without limitation pairwise distances, cosine similarity, the Jaccard similarity, Euclidean similarity, and relative entropy. For example, for Jaccard similarity, identical data objects exhibit a pairwise similarity of 1, over the range of [0, 1]. For Cosine similarity, identical data objects exhibit a pairwise similarity of 1, over the range of [−1, 1]. For Euclidean similarity, identical data objects exhibit a pairwise similarity of 1, over a range of [−∞, 1].

A canopy mapper uses the pairwise similarity metrics (e.g., approximated "distances" in this example) to identify candidate canopy centers from among the data objects in the portion of the input dataset based on a tight mapping condition. In one implementation, the canopy mapper iteratively compares the computed distance between a canopy center data object and a test data object to the tight mapping threshold $T_2$. If the distance-based similarity metric falls below the tight mapping threshold $T_2$ (an example of satisfying the tight mapping condition), then the test data object is deemed to lie within the canopy defined by the canopy center data object and the tight mapping threshold $T_2$ and therefore the test data object can be removed from future consideration as a candidate canopy center. In contrast, if the distance-based similarity metric meets or exceeds the tight mapping threshold $T_2$, the tests data object may qualify as a canopy center and may be inserted into a center data object set at a later iteration of the iterative computation of the canopy mapper. In one implementation, the output from a canopy mapper includes a set C of canopies, wherein each canopy is represented by a canopy center $x_i$ and a corresponding is canopy label $l_i$, such that $$C=\{c_1, \ldots, c_k\}$$

where $c_j=(x_i,l_i)$, k represents the number of canopy centers defined in the portion of the dataset, $j=1, \ldots, k$, $i \in \{1, \ldots, n\}$, and n represents the number of data objects in the portion of the dataset.

The outputs of the canopy mappers are input in combination to a canopy merger 112, which examines the canopy set C output from the canopy members, computing pairwise similarity metrics between canopies, and merging one or more canopies based on a tight merger condition (e.g., comparing those similarity metrics to the tight merger threshold $T_3$). In one implementation, the tight mapping threshold and the tight merger threshold are equal. A similarity metric between two canopies is determined to be minimum of the pairwise distances (or the maximum of the pairwise similarities) calculated between the centers in the first canopy and the centers in the second canopy. In one implementation, if a pairwise distance (an example similarity metric) between two canopies falls below the tight merger threshold $T_3$, then the canopy merger 112 merges the two canopies into a multi-center canopy. In subsequent iterations of the canopy merger operation, the multi-center canopy may be merged with other canopies. Likewise, other single-center canopies may be merged into their own multi-center canopies.

In one implementation, the output from a canopy merger includes a set C' of canopies, wherein at least one canopy is a multi-center canopy and each canopy is represented by a label $l_t$ and a center $x_t$, such that $$C'=\{c'_1, \ldots c'_p\}$$

where $c'_t=(Q_t,l_t)$, $t \in \{1, \ldots, p\}$, p represents the number of canopies defined in association with the dataset after the canopy merger operation (whether multi-center or single center canopies), and $Q_t$ represents a set of one or more data objects designated as a center of canopy t (whether multi-center or single center).

A canopy assignor 114 receives the output C' of the canopy merger 112, a set X' comprising N data objects of the entire dataset (e.g., all portions of the dataset mapped by the canopy mappers). The canopy assignor 114 iterates through each of the data objects in X', computing pairwise similarity metrics between the data object and each canopy, and determining whether the similarity metric satisfies a loose assignment condition. In one implementation, a similarity metric in the form of a pairwise distance between a data object and a canopy is determined to be minimum of the pairwise distances calculated between the data object and the centers in the canopy. (By analogy, a similarity metric in the form of a pairwise similarity between a data object and a canopy is determined to be a maximum of the pairwise similarities calculated between the data object and the centers of the canopy). In one implementation, the canopy assignor 114 compares the similarity metrics of each data object relative to each canopy to the loose assignment threshold $T_1$. If a similarity metric in the form of a pairwise distance between the data object and a particular canopy falls below a loose assignment threshold $T_1$ (an example loose assignment condition), then the data object is assigned to that canopy in C'. Some data objects may be assigned to multiple overlapping canopies in C', if the distance-based similarity metrics relative to those canopies fall below the loose assignment threshold $T_1$. In one implementation, the output from a canopy assignor 114 includes a set S of data objects and their corresponding canopy labels, such that $$S=\{\langle x_i, l_{ij_i}\rangle\}$$

where $i=1, \ldots, N$, $j_i \in \{1, \ldots, p\}$, p represents the number of canopies defined in association with the dataset after the canopy merger operation (whether multi-center or single center canopies), and $l_{ij_i}$ represents the label of canopy $c_{ij_i}$.

A clusterer 116 receives the output of the canopy assignor 114 and iterates through each canopy $c_{ij_i}$ to partition the data objects within the individual canopies (e.g., sets of data objects that share the same canopy). In one implementation, the clusterer 116 executes a rigorous clustering algorithm, such as K-means, Expectation-Maximization, Greedy Agglomerative Clustering, etc. with the constraint of limiting the similarity metrics to data objects within the same canopy (whether multi-center or single center). The clusterer 116 outputs clusters of data objects, wherein data objects designated in the same cluster are deemed to be sufficiently similar to each other be classified together. The data objects 102 are partitioned into multiple clusters 118, 120, and 122 through 124. For example, if the data objects 102 relate to patient diagnoses, then cluster 118 may represent influenza diagnoses, cluster 120 may represent viral diagnoses, cluster 122 may represent a tuberculosis diagnosis, and cluster 124 may represent bronchitis diagnoses of the range of patient diagnoses recorded in the document library 104.

Figure 2:
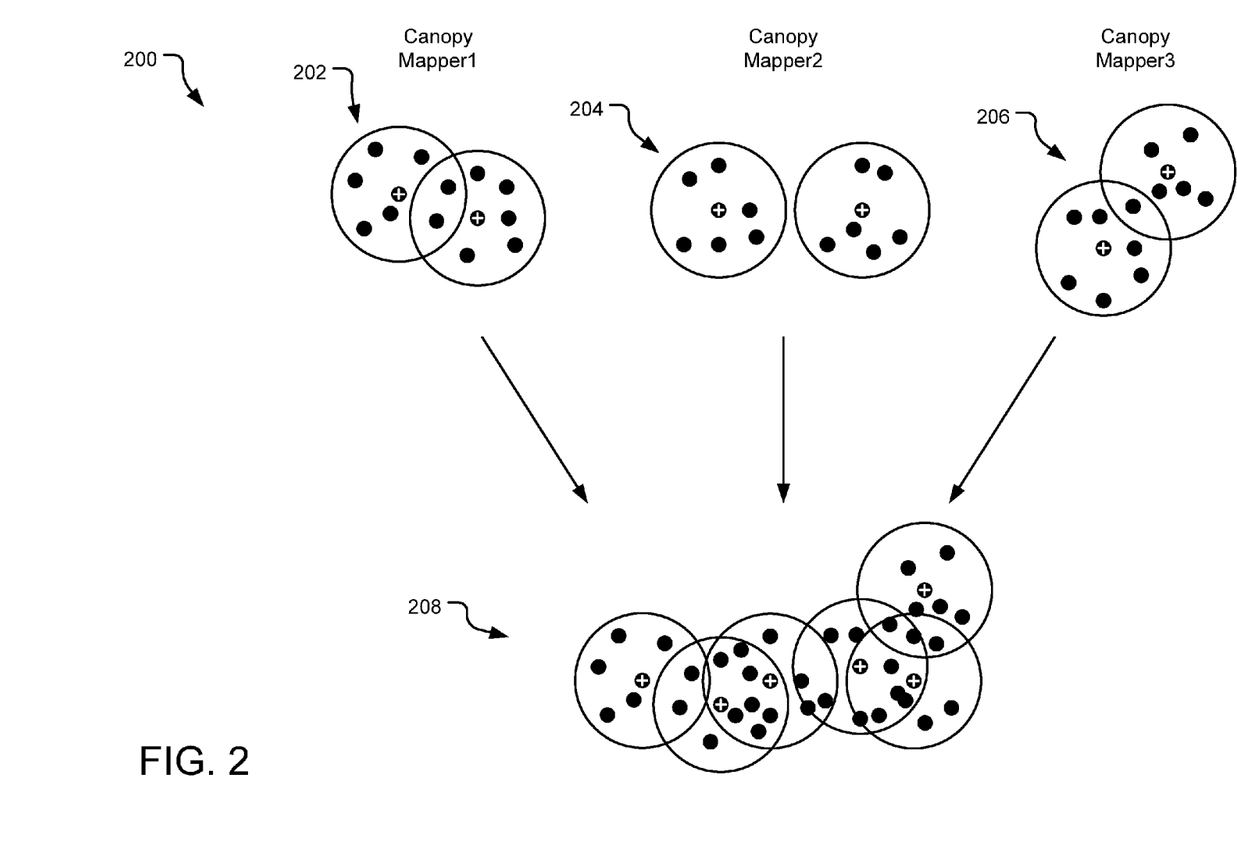
FIG. 2 illustrates an example mapping of data objects into multiple centered canopies by multiple mappers.

FIG. 2 illustrates an example mapping 200 of data objects into multiple centered canopies by multiple parallel canopy mappers (Canopy Mapper1, Canopy Mapper2, and Canopy Mapper3). Each canopy mapper inputs a portion of a dataset, with each data object in FIG. 2 being depicted by a black circle. For example, Canopy Mapper1 inputs portion 202, Canopy Mapper2 inputs portion 204, and Canopy Mapper3 inputs portion 206. Each canopy mapper iterates through the data objects in its portion, selecting a center data object in the portion, computing the approximated similarity metric between the center data object and a test data object in the portion, and determining whether the test data object satisfies a tight mapping condition (e.g., based on a tight mapping threshold $T_2$ relative to the center date object). If so, the test data object is deemed to be in the canopy defined by the center data object, and the test object is removed from future consideration as a center data object.

Within the portion 202 of the dataset, the Canopy Mapper1 has designated two single-center canopies, wherein the canopy centers are depicted by black circles with crosses at their centers and the canopy boundaries are depicted by solid-line circles. Similar designations are shown for Canopy Mapper2 and Canopy Mapper3. In some cases, the identified canopies output by a canopy mapper may or may not overlap (compare the output of Canopy Mapper1 with the output of Canopy Mapper2. The outputs of the canopy mappers are combined in accordance with their relative feature vectors and input to a canopy merger, as shown at 208.

Figure 3:
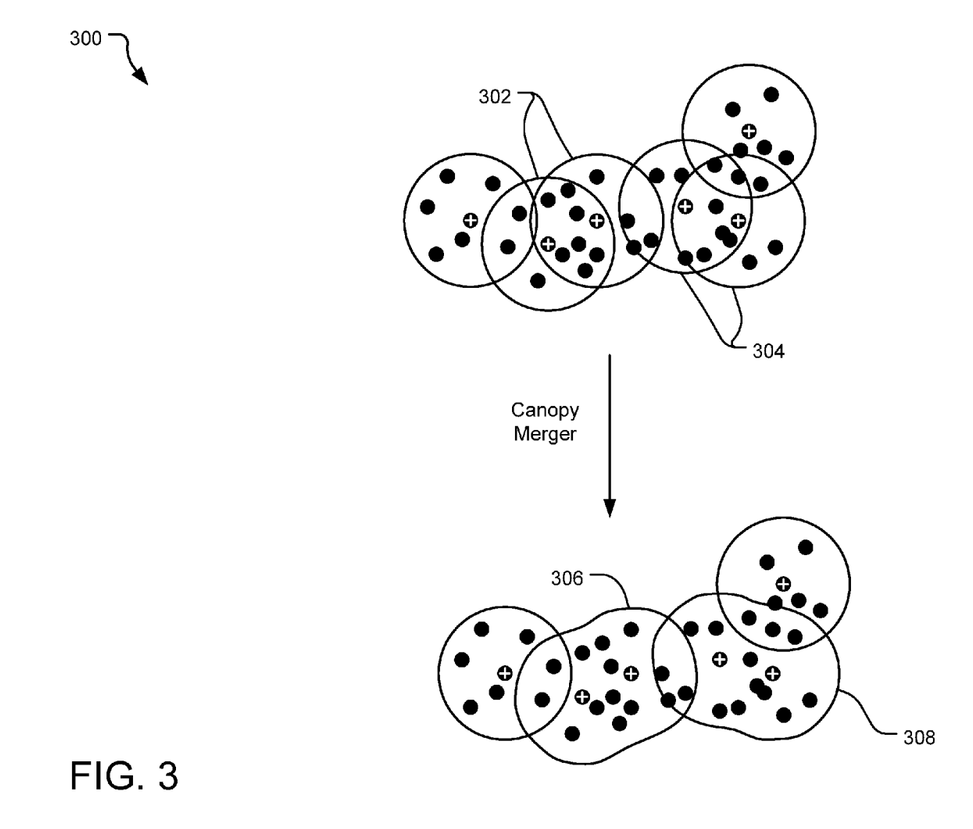
FIG. 3 illustrates an example merger of two pairs of centered canopies into two merged canopies.

FIG. 3 illustrates an example merger 300 of two pairs of centered canopies (302 and 304) into two merged canopies (306 and 308). A canopy merger iterates through each of the canopy centers, merging canopies having at least one center that satisfies a tight merger condition (e.g., the minimum pairwise distance between centers in one canopy and centers in the other canopy is less than the tight merger threshold $T_3$). In some circumstances, although not shown, more than two canopies can be merged into a single merged canopy, such that a merged canopy can have more than two centers.

Figure 4:
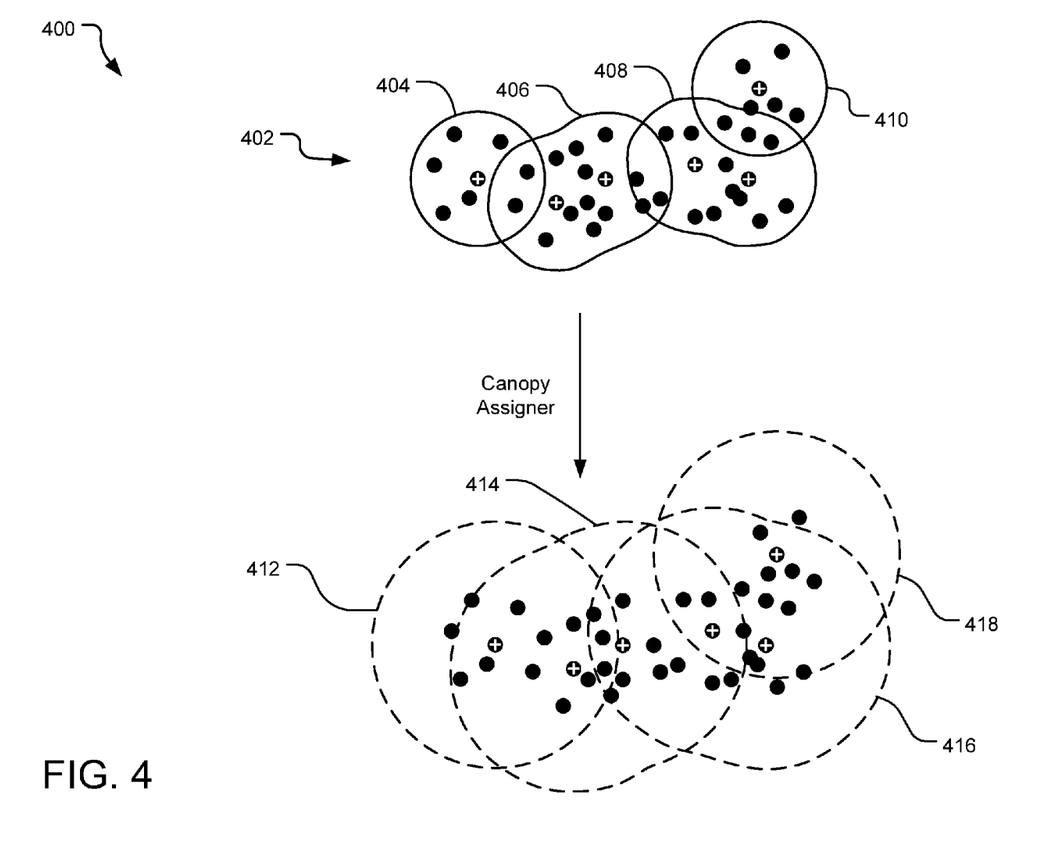
FIG. 4 illustrates an example canopy assignment of data objects into a set of merged and unmerged canopies.

FIG. 4 illustrates an example canopy assignment 400 of data objects into a set of merged and unmerged canopies 402. Based on a loose assignment condition, data objects are assigned the labels of one or more individual canopies 404, 406, 408, and 410. For example, in FIG. 4, a loose assignment threshold $T_1$ encompasses the date objects within bounds 412, 414, 416, and 418, which are associated with the canopies 404, 406, 408, and 410, respectively.

The data objects assigned to each labeled canopy can then be evaluated against each other data object assigned to that same canopy, to the exclusion of those data objects not assigned to the same canopy, using a rigorous clustering algorithm. As a result, the rigorous clustering operation is constrained to pairwise distance computations between data objects in the same loose canopy, rather than all data objects in the dataset, resulting in a significant increase in efficiency.

Figure 5:
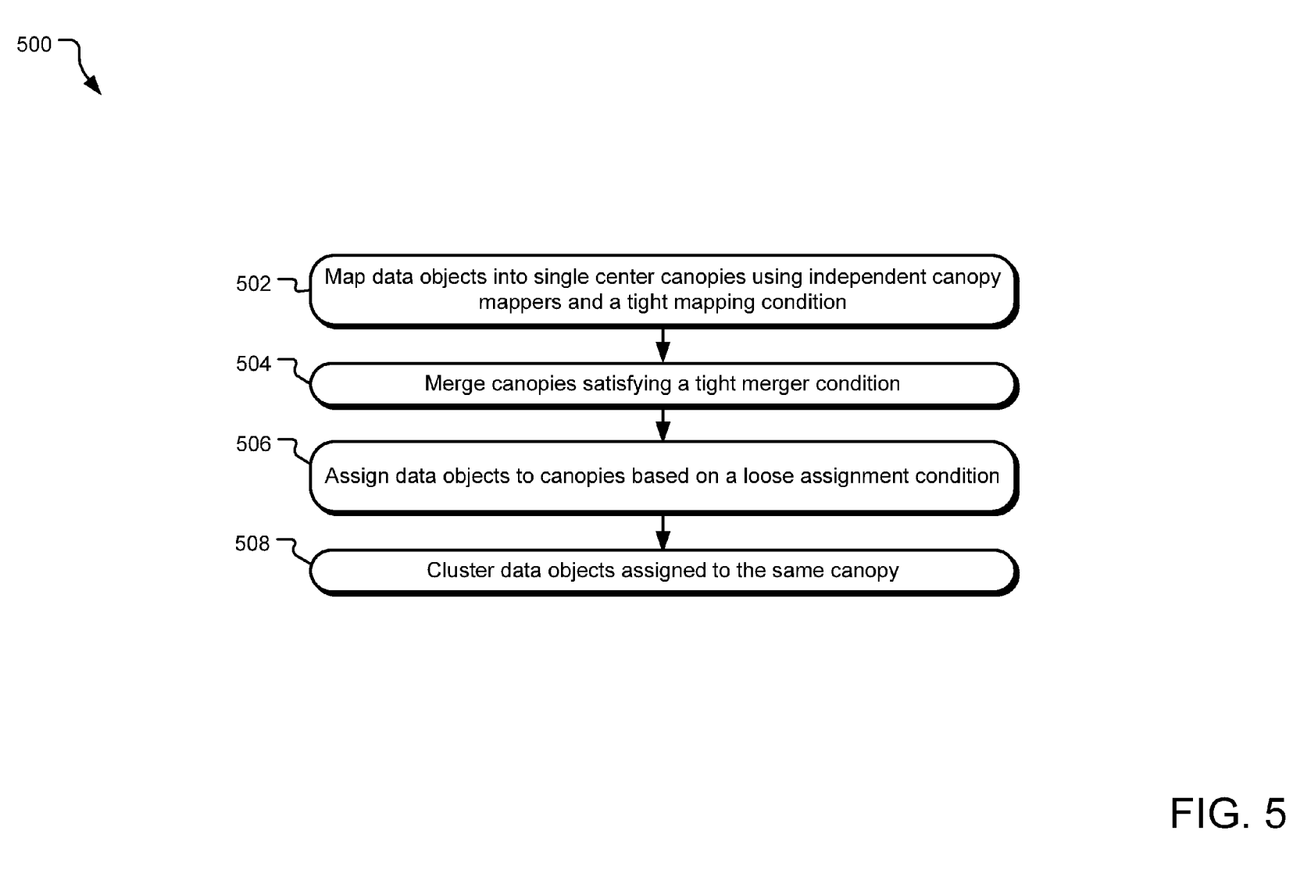
FIG. 5 illustrates example operations for using multi-center canopy clustering to partition data objects of a dataset.

FIG. 5 illustrates example operations 500 for using multi-center canopy clustering to partition data objects of a dataset. A canopy mapping operation 502 maps data objects from one or more portions of the dataset into single center canopies based on a tight mapping condition. In one implementation, one or more canopy mappers independently perform the mapping operation 502 (e.g., mappers that do not rely on data from any other portion of the dataset or on any other mapper). The canopy mappers may execute in parallel and/or one or more canopy mappers can execute at least in part as part of a sequence. In the mapping operation 502, canopies may be defined by a center data object and a tight mapping threshold $T_2$.

The outputs of the canopy mapping operation 502 are input to a canopy merging operation 504, which merges canopies that satisfy a tight merger condition (e.g., as defined by a tight merger threshold $T_2$) into multi-center canopies. A canopy assignment operation 506 assigns each data object in the dataset to one or more of the canopies, whether the canopies are single or multi-center canopies. In one implementation, the canopy assignment operation 506 uses a loose assignment condition (e.g., as defined by a loose assignment threshold $T_1$). It should be understood that each data object may reside in one or more canopies.

Generally, the tight mapping condition is based on a tight mapping threshold $T_2$, the tight merger condition is based on a tight merger threshold $T_3$, and the loose assignment condition is based on a loose assignment threshold $T_2$. In one implementation, the thresholds are set based on the following relationship $T_1 > T_3 = T_2 > 0$, although other relationships may also be applied.

A data clustering operation 508 partitions the data objects in the dataset by executing a rigorous clustering algorithm on the data objects in each canopy. Example rigorous clustering algorithm may include K-means, Expectation-Maximization, Greedy Agglomerative Clustering, etc. with the constraint of limiting the distance calculations to data objects within the same canopy (whether multi-center or single center). In this manner, the cost of the more rigorous distance calculations of these and similar algorithms are constrained to a smaller scope.

Figure 6:
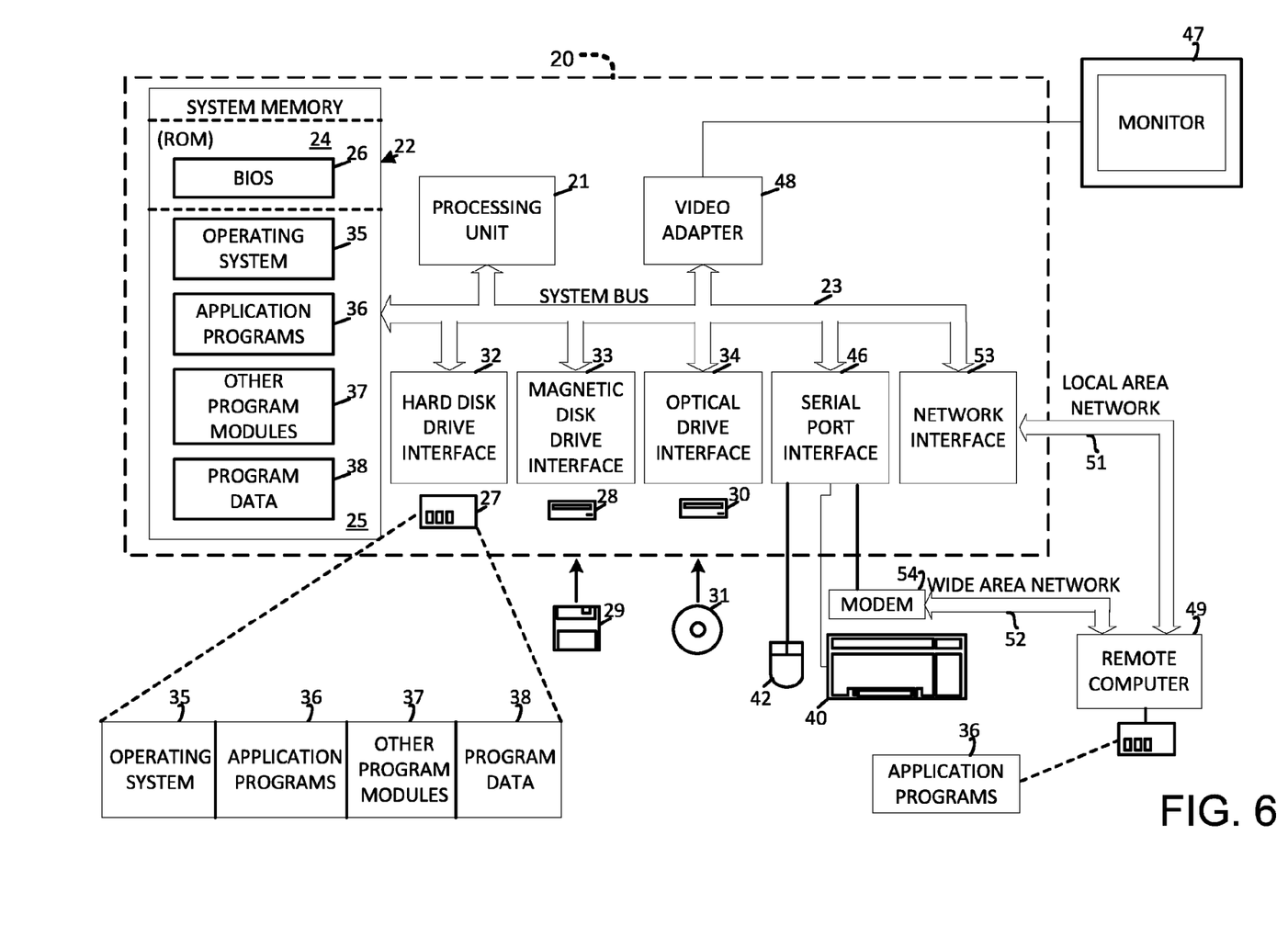
FIG. 6 illustrates an example system that may be useful in implementing the technology described herein.

FIG. 6 illustrates an example system that may be useful in implementing the technology described herein. FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated storage media provide nonvolatile storage of computer-readable instructions, data structures, program engines, and other data for the computer 20. It should be appreciated by those skilled in the art that any type of computer-readable storage media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, magnetic disk 29, optical disk 31, ROM 24, or RAM 25, including an operating system 35, one or more application programs 36, other program engines 37, and program data 38.

A user may enter commands and information into the personal computer 20 through input devices such as a keyboard 40 and pointing device 42. Other input devices (not shown) may include a microphone, joystick, game pad, satellite dish, scanner, gestures input, touch entry, voice entry, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a tight canopy mapper, a canopy merger, a canopy assigner, a clusterer, and other operators and services may be embodied by instructions stored in memory 22 and/or storage devices 29 or 31 and processed by the processing unit 21. Data objects, similarity metrics, mapping conditions, merger conditions, assignment conditions, thresholds, and other data may be stored in memory 22 and/or storage devices 29 or 31 as persistent datastores. Further, operators and services can represent hardware and/or software configured to provide service functionality for network-connected systems. Such operators and services may be implemented using a general-purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method executed by a processor comprising:
    mapping data objects of a dataset defined in memory to individual single center canopies according to a tight mapping condition, each center corresponding to one of the mapped data objects;
    merging using a processor at least two of the single center canopies into a multi-center canopy according to a tight merger condition, each multi-center canopy having at least two separate centers each corresponding to a different mapped data object;
    assigning each data object of the dataset to one or more of the multi-center canopies and unmerged single center canopies; and
    partitioning the data objects of the dataset by clustering the data objects that share the same canopy.

2. The method of claim 1 wherein the mapping operation comprises:
    mapping different data objects to the individual single center canopies using independent canopy mapping operations for at least two of the single center canopies.

3. The method of claim 1 wherein the merging operation comprises:
    merging the at least two of the single center canopies into a multi-center canopy, if the at least two single center canopies satisfy the tight merger condition.

4. The method of claim 3 where in the tight merger condition is satisfied if a similarity metric representing a distance between the at least two canopies is less than a tight merger threshold.

5. The method of claim 3 wherein the tight merger condition is satisfied if the similarity metric between two canopies satisfies the tight merger condition, and the similarity metric between two canopies is determined by finding a minimum pairwise distance between any center of a first canopy and any center of a second canopy.

6. The method of claim 1 wherein the assigning operation comprises:
    assigning a data object of the dataset to a canopy if the data object and the canopy satisfy a loose assignment condition.

7. The method of claim 6 wherein the loose assignment condition is satisfied if a similarity metric representing a distance between the data object and the canopy is less than a loose assignment threshold.

8. The method of claim 6 wherein the loose assignment condition is satisfied if the similarity metric between the data object and the canopy satisfies the loose assignment condition and the similarity metric is determined by finding a minimum pairwise distance between the data object and any center of a canopy.

9. A system comprising:
a processor;
one or more canopy mappers configured to map data objects of a dataset to individual single center canopies according to a tight mapping condition, each center corresponding to one of the mapped data objects;
a canopy merger configured to merge at least two of the single center canopies into a multi-center canopy according to a tight merger condition, each multi-center canopy having at least two separate centers each corresponding to a different mapped data object; and
a canopy assigner configured to assign each data object of the dataset to one or more of the multi-center canopies and unmerged single center canopies.

10. The system of claim 9 wherein the canopy merger is configured to merge the at least two of the single center canopies into a multi-center canopy, if a similarity metric computed between at least two single center canopies satisfy the tight merger condition, the similarity metric between two canopies being determined by finding a minimum pairwise distance between any center of a first canopy and any center of a second canopy.

11. The system of claim 9 wherein the canopy assigner is configured to assign a data object of the dataset to a canopy if the similarity metric between the data object and the canopy satisfies a loose assignment condition, the similarity metric being determined by finding a minimum pairwise distance between the data object and any center of a canopy.

12. One or more computer-readable storage hardware device encoding computer-executable instructions for executing on a computer system a computer process, the computer process comprising:
mapping data objects of a dataset to individual single center canopies according to a tight mapping condition, each center corresponding to one of the mapped data objects;
merging at least two of the single center canopies into a multi-center canopy according to a tight merger condition, each multi-center canopy having at least two separate centers each corresponding to a different mapped data object; and
assigning each data object of the dataset to one or more of the multi-center canopies and unmerged single center canopies.

13. The one or more computer-readable storage hardware device of claim 12 wherein the mapping operation comprises:
mapping different data objects to the individual single center canopies using independent canopy mapping operations for at least two of the single center canopies.

14. The one or more computer-readable storage hardware device of claim 12 wherein the merging operation comprises:
merging the at least two of the single center canopies into a multi-center canopy, if the at least two single center canopies satisfy the tight merger condition.

15. The one or more computer-readable storage hardware device of claim 14 where in the tight merger condition is satisfied if a similarity metric representing a distance between the at least two canopies is less than a tight merger threshold.

16. The one or more computer-readable storage hardware device of claim 14 wherein the tight merger condition is satisfied if the similarity metric between two canopies satisfies the tight merger condition, and the similarity metric between two canopies is determined by finding a minimum pairwise distance between any center of a first canopy and any center of a second canopy.

17. The one or more computer-readable storage hardware device of claim 12 wherein the assigning operation comprises:
assigning a data object of the dataset to a canopy if the data object and the canopy satisfy a loose assignment condition.

18. The one or more computer-readable storage hardware device of claim 17 wherein the loose assignment condition is satisfied if a similarity metric representing a distance between the data object and the canopy is less than a loose assignment threshold.

19. The one or more computer-readable storage hardware device of claim 17 wherein the loose assignment condition is satisfied if the similarity metric between the data object and the canopy satisfies the loose assignment condition and the similarity metric is determined by finding a minimum pairwise distance between the data object and any center of a canopy.

20. The one or more computer-readable storage hardware device of claim 12 wherein the computer process further comprises:
partitioning the data objects of the dataset by clustering the data objects that share the same canopy.

\* \* \* \* \*